No. 745,717. PATENTED DEC. 1, 1903.
B. DONALDSON.
CULINARY SCRAPER.
APPLICATION FILED JULY 29, 1903.

NO MODEL.

Witnesses
Chas. F. Clagett
W. S. Ball

Inventor
Bertha Donaldson.
By her Attorney
Charles A. Stephens

No. 745,717. Patented December 1, 1903.

UNITED STATES PATENT OFFICE.

BERTHA DONALDSON, OF YONKERS, NEW YORK.

CULINARY SCRAPER.

SPECIFICATION forming part of Letters Patent No. 745,717, dated December 1, 1903.

Application filed July 29, 1903. Serial No. 167,403. (No model.)

*To all whom it may concern:*

Be it known that I, BERTHA DONALDSON, a citizen of the United States, and a resident of Yonkers, in the county of Westchester and State of New York, have invented certain new and useful Improvements in Culinary Scrapers, of which the following is a specification.

The subject of this invention is a novel culinary scraper having for its object the production of a device of the character described which will be simple and inexpensive, highly efficient in use, and which will avoid the scratching and defacement of the pans, &c., in connection with which it is used, the said device being also of such a nature that it may at all times be maintained in a cleanly condition.

With the above purposes in view the improved culinary scraper comprises a circular body, preferably stamped up from tin and having its top closed, at which point it is provided with a rigid yoke-shaped handle or bail, also of metal, a series of vertical scraping-blades being intimately disposed externally on the annular wall of the body.

Figure 1:
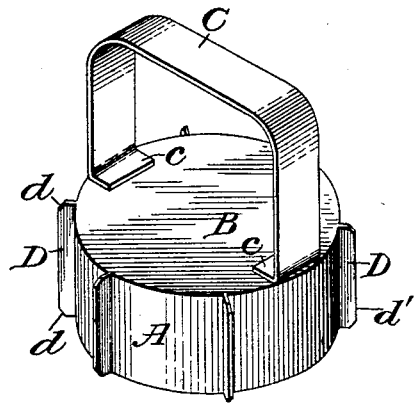
Figure 2:
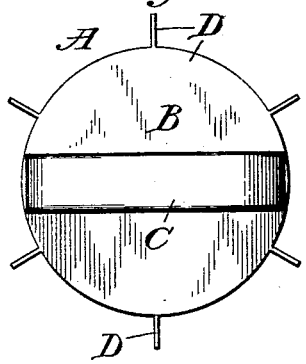
Figure 3:
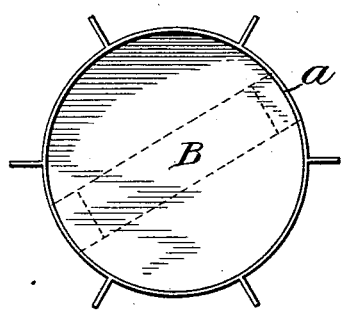
Figure 4:
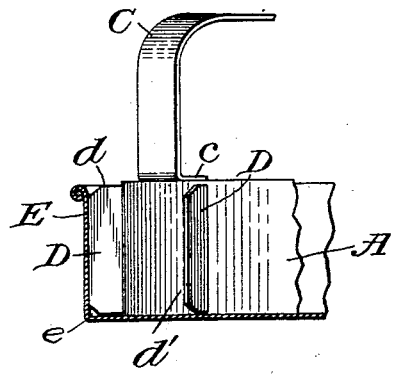

In the accompanying drawings, forming part of this specification, Figure 1 is a perspective view of a culinary scraper embodying my invention. Fig. 2 is a plan view thereof, and Fig. 3 is an inverted view of the same. Fig. 4 is a detail sectional view of a portion of a pan, illustrating how the vertical blades of the device serve in connection with the vertical inner face of the pan flange or side.

Similar reference characters are employed to designate corresponding parts throughout the several figures of the drawings wherein they occur.

The body of the device is preferably stamped or shaped from sheet metal, such as tin, so as to present the annular vertical wall A and top B, the latter having mounted thereon the yoke-shaped handle or bail C, which has its lower terminal portions $c$ turned inward to bear upon and be secured to the top by soldering or otherwise.

On the annular wall A of the body are secured a series of equidistantly-located vertical blades D, the inner straight edge of each of which bears and is intimately secured against the external face of said wall. Each of these blades has upper and lower end edges $d$, which are beveled or reduced to avoid pronounced outer angles which might tend to objectionably scratch or mar the surface of the pans or other utensils with which the device is to be used. It will be observed that the outer edges $d'$ of said blades are somewhat extended to provide adequate scraping edges for operating against the inner surfaces of the vertical sides of the pan.

From the description thus far it will be readily comprehended that the fingers of one hand may be readily passed beneath the top portion of the handle, so that the latter can be grasped by said fingers and the thumb resting upon the upper side of said handle. With the device held as thus described the lower plain circular edge $a$ of the body can be moved over the upper surface of the pan-bottom, so as to efficiently scrape and remove any grease or other matter thereon. It will be observed that by reason of the circular character of said lower edge $a$ the movement of the device in any direction will result in the same scraping effect, and, furthermore, that any scarring or scratching action, such as might result from a transverse straight edge, will be avoided, inasmuch as there are no end angles and also by reason of the fact that such edge presents the same curvature irrespective of the direction in which it is moved. The beveled or reduced character of the lower ends of the blades results in such portions positively clearing the pan-bottom while the latter is being scraped by the lower edge $a$.

Fig. 4 illustrates how the device may be manipulated to remove grease, &c., from the inner surface of the vertical wall or flange of a pan. It will be seen in this figure that the vertical edge $d'$ of one of the blades can be moved in contact with such inner surface of the pan-rim and that by slightly elevating the device the blade edge will also scrape the upper portion of such surface. Any accumulations in the crevice $e$ presented at the intersection of the pan-bottom and its rim can be dislodged by simply holding the device so that one of its blades D can be applied with its longest edge horizontally foremost at such crevice.

Both the handle and blades can be secured to the body by means other than soldering. The blades being of tin can each have a couple of copper rivets attached thereto, so that the shank of said rivets will pass through perforations provided therefor in the annular wall A of the body and be clenched or upset at the inner side thereof.

The scraper being entirely of metal can be comparatively light and will not be effected by heat. Moreover, it can be washed whenever required and thus kept thoroughly clean.

I do not wish to be understood as limiting myself to the precise construction shown and described, but reserve the right to such modification and changes as may be fairly considered within the scope of my invention.

Having now described my invention, what I claim as new, and desire to secure by Letters Patent, is—

A culinary scraper embodying a comparatively shallow cylindrical body consisting of an annular wall and top in a single piece of sheet metal, said wall presenting a plain circular lower edge, a series of thin radially-disposed vertical blades secured externally on said annular wall and provided with upper and lower beveled ends, and a metal yoke-shaped handle or bail rigidly secured on said top.

Signed at Yonkers, in the county of Westchester and State of New York, this 17th day of July, A. D. 1903.

BERTHA DONALDSON.

Witnesses:
JENNIE GOODYEAR,
ETTA McELROY.